United States Patent Office 3,488,417
Patented Jan. 6, 1970

3,488,417
VETERINARY PREPARATIONS HAVING A COATING RESISTANT TO THE RUMEN CONTENTS
Teunis Kralt and Johan Albert Carel Kroesen, Weesp, Netherlands, assignors, by mesne assignments, to U.S. Philips Corporation, New York, N.Y., a corporation of Delaware
No Drawing. Filed Aug. 21, 1967, Ser. No. 661,791
Claims priority, application Netherlands, Aug. 26, 1966, 6612024
Int. Cl. A61k *27/00, 27/12*
U.S. Cl. 424—33                    4 Claims

ABSTRACT OF THE DISCLOSURE

Copolymer of styrene and maleic anhydride imidified with an alkylenediamine, as a rumen fluid resistant coating for oral administration of drugs, vitamins and nutrients to ruminants.

---

It is known that ruminants such as cows, sheep and goats form a special class among animals in view of their digestive system. This involves that oral administration of medicines and nutrients has to meet special requirements. Substances taken per os pass through the rumen before the rennet stomach is reached. The substances stay therein for a long time in a medium which is weakly acidic as compared with that of the rennet stomach, whilst, in addition, bacteria and protozoa and enzymes separated out by them are found therein.

The interaction between the substance taken per os and these microorganisms may be of two different natures. The substance may be destroyed by said organisms, so that it is no longer useful to the animal or the substance may have a noxious effect on the organisms, so that they no longer perform their functions with the deterimental effects on the animal.

It is known, for example, that orally administered vitamins, for example, vitamin A, are destroyed during their stay in the rumen for the major part. It is furthermore known that antibiotics are destroyed for a given part and may, in addition, disturb the equilibrium in the rumen population. It is also known that the administration of high-grade proteins or amino-acids is little effective, since they are converted for the major part by the population into low-grade bacterial proteins. Moreover, it is known that the wool production of sheep can be raised to three times the normal quantity when the animals receive an infusion of a sulphur-containing amino-acid or some sulphur-containing proteins, whereas no increase is found when these substances are administered orally. Also medicines, for example, means for combating stomach and intestine parasites, liver fluke and lung worm have to pass, when administered orally, through the rumen without being altered and they should not disturb the rumen population.

If, in order to protect the administered substances and the rumen population, the substances have to be provided with a coating resistant to the rumen medium, provisions have to be made to ensure that the substances get at the intended place and can be resorbed, if necessary. It has therefore to be ensured that in the rennet stomach or in the intestinal canal the coating becomes permeable for the enveloped substance.

The coating substance has to fulfil a great number of requirements. This substance should release the enveloped substance not before the rennet stomach or the intestines so that in the rumen medium it should be completely resistant and impermeable and therefore be a satisfactory film former, and it has to be harmless to the ruminant and its rumen population. The coated preparation must be preservable for a long time, as the case may be in nutrient concentrates. Therefore, both the coating substance and the coated substance inside have to be satisfactorily preservable.

Surprisingly it has been found that copolymers of styrene and maleic acid anhydride, which are amidified to imide with N,N-dialkyl-alkylene diamine satisfy said requirements. Suitable diamines are those of the Formula I:

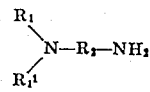

wherein $R_1$, $R_1{}^1$ is an alkyl group having 1 to 4 carbon atoms and $R_2$ is an alkylene group with 2 to 4 carbon atoms.

The invention relates to veterinary preparations containing nutrients or medicines having a rumen coating and is characterized in that the coating consists of a copolymer of styrene and maleic acid anhydride, amidified to imide with an alkylenediamine of the Formula I:

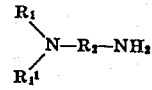

wherein $R_1$ and $R_1{}^1$ are an alkyl group with 1 to 4 carbon atoms and $R_2$ is an alkylene group with 2 to 4 carbon atoms.

It has to be observed that the invention includes both preparations that contain the rumen resistant coating material only in the outmost layer and preparations that are an intimate mixture of the rumen resistant coating material and the substance to be enveloped.

Examples of such alkylene diamines are:

N,N-diethyl-ethylene diamine,
N,N-dimethylpropylene diamine,
N,N-dimethyl-ethylene diamine,
N,N-dipropyl ethylene diamine,
N,N-dibutyl ethylene diamine,
N,N-diethyl propylene diamine,
N,N-dipropylpropylene diamine, and
N,N-dimethyl butylene diamine.

N,N-diethyl ethylene diamine, however, is preferred.

Some compounds, for example, penicillin are destroyed by gastric juice. The invention now permits of introducing such substances, which may also affect the rumen population into the intestines without unwanted effects, whilst they are protected from the gastric juice. For this purpose the active substance is first enveloped by a coating resistant to the gastric juice of the kind also used for preparations intended for human pharmaceutical preparations, for example those formed from cellulose acetate-phthalate, after which they are coated with a co-polymer of the kind described above.

The invention therefore also relates to veterinarian preparations with nutrients or medicines, which have not only a rumen coating consisting of a co-polymer of maleic acid anhydride and styrene, amidified to imide with an alkylene diamine but also a coating resistant to gastric acid.

Suitable nutrients or medicines for mixing with the preparations according to the invention are, for example, hormones, carbohydrates, such like dextrines and glucose, antibiotics such as penicillin, tetracycline, zinc bacitracine, vitamins, for example A and E, amino-acids and proteins, such as lysine, methionine, cysteine and blood proteins, furthermore liver fluke and lung worm preparations and other medicines.

The preparations according to the invention may be produced in methods known per se. Cores of active substance may be pressed, mixed if desired with excipients, the cores being enveloped in the coating, for example, by applying the coating dissolved in a volatile solvent to the cores in the form of a dust.

It is also possible to mix the rumen resistant material as a powder or a granulate with the substance to be protected. The mixture may then be extruded under elevated temperature and pressure. Thereupon the product may be cut down to a desired size.

Alternatively the rumen resistant material may be dissolved in a suitable solvent. The compound to envelop may be added as such or as a solution. After intimately mixing the mixture thus obtained may be poured out to obtain a thin layer. The folio obtained after evaporation of the solvent may be cut down for example with the help of scissors.

In this manner a rumen resistant preparation was prepared from the following ingredients:

4.4 g. of a copolymer of styrene and maleic acid anhydride amidified to imide with N,N-diethylethylenediamine having an intrinsic viscosity in dioxane at 20° C. of 0.1–0.05 l./g.
30 ml. acetone
600 mg. vitamin A-acetate
50–100 mg. of a mixture consisting of equal parts butylated hydroxy anisole (BHA) and butylated hydroxy toluene (BHT).

Such a composition containing vitamin A marked $C^{14}$ was tested as follows with regard to effectiveness.

Two comparable groups of bucks were treated. One group received 0.5 standard units of vitamin A per buck, incorporated in small lumps of calf fodder; the other group received an equal quantity of vitamin A coated according to the invention, also incorporated in small lumps. (A hole was made in the lumps and the preparation was brought therein after which the hole was further filled with powder obtained in boring the hole.) Fifteen days after the administration the animals were killed and the quantity of vitamin A stored in the liver was assessed. The animals which had received a coated composition had stored twice the quantity of vitamin A as compared with the animals of the control-group.

The harmlessness of the coating for the rumen population was proved by the following test.

To 50 ml. of rumen fluid was added 100 mg. of coating, after which the fluid was kept for 24 hours at 38° C. under carbon dioxide. It was occasionally assessed for the very sensitive protozoa what number of living protozoa was left in the fluid and the result was compared with a control-test without coating. It was found that the coating does not affect the protozoa.

As another example of a preparation according to the invention the preparation may be mentioned prepared as follows:

34 g. of a copolymer of styrene and maleic acid anhydride amidified to imide with N,N-diethyl ethylene diamine was dissolved in 100 ml. acetone. 1.2 g. hycar styrene-butadiene copolymer plasticizer dissolved in 30 ml. benzene was added.

10.5 g. penicillin sodium was dissolved in 10 ml. water. 80 ml. of a cold solution of glycine and hydrochloric acid having $pH_2$ was added. The mixture was extracted three times with 30 ml. ethylacetate. The extract of penicillin in ethylacetate was added to the above mentioned solution of the copolymer. The mixture was stirred, poured out and after evaporation of the solvents the folio obtained was cut down to the desired size.

What is claimed is:
1. A solid veterinary composition adapted for oral administration to a ruminant said composition comprising a substance orally beneficial to said ruminant and a coating resistant to deterioration in the rumen, surrounding said substance, said coating being a copolymer of styrene and the imide of maleic anhydride and an alkylene diamine of the formula

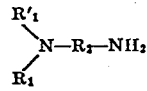

wherein $R'_1$ and $R_1$ are each alkyl of 1 to 4 carbon atoms inclusive, and $R_2$ is alkylene of 2 to 4 carbon atoms inclusive.

2. The solid veterinary composition of claim 1 wherein between the substance orally beneficial to the ruminant and the coating resistant to deterioration in the rumen there is a coating resistant to gastric juice surrounding said substance.

3. A method of administering to a ruminant a substance beneficial to said ruminant but subject to deterioration in the rumen said method comprising orally administering to said ruminant to composition of claim 1.

4. A method of administering to a ruminant a substance beneficial to said ruminant but subject to deterioration in the rumen said method comprising orally administering to said ruminant the composition of claim 2.

References Cited

UNITED STATES PATENTS

| | | | |
|---|---|---|---|
| 2,066,105 | 12/1936 | Hagedorn et al. | 424—33 |
| 2,897,121 | 7/1959 | Wagner | 424—33 |
| 3,081,233 | 3/1963 | Enz et al. | 424—33 |
| 3,143,472 | 8/1964 | Lappas et al. | 424—33 |
| 3,282,790 | 11/1966 | Johnson | 424—33 |

S. K. ROSE, Primary Examiner